Figure 1:
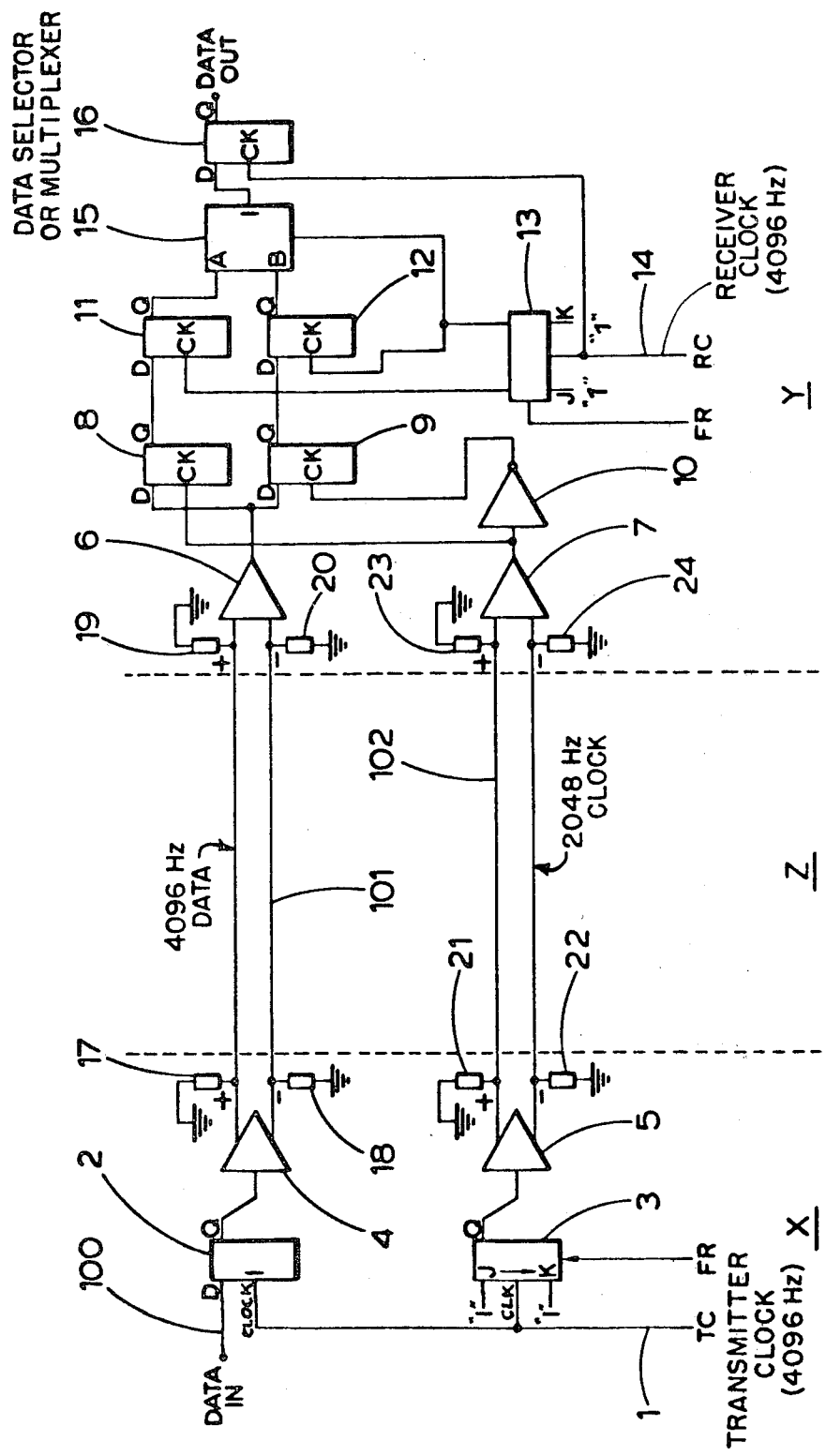

United States Patent [19]

Betts

[11] 4,430,745
[45] Feb. 7, 1984

[54] DIGITAL DATA TRANSMISSION

[75] Inventor: Colin R. Betts, Ipswich, England

[73] Assignee: Post Office, London, England

[21] Appl. No.: 347,057

[22] Filed: Feb. 8, 1982

Related U.S. Application Data

[63] Continuation of Ser. No. 42,224, May 24, 1979, abandoned.

[30] Foreign Application Priority Data

May 30, 1978 [GB] United Kingdom ............... 24413/78

[51] Int. Cl.³ ............................................ H04L 25/02
[52] U.S. Cl. ..................................... 375/25; 375/111; 375/112; 370/118
[58] Field of Search ......................... 375/25, 111, 112; 370/118

[56] References Cited

U.S. PATENT DOCUMENTS

| | | |
|---|---|---|
| 3,482,048 | 12/1969 | Takada ................................. 370/118 |
| 3,531,777 | 9/1970 | West . |
| 3,702,379 | 11/1972 | Peterson . |
| 3,730,994 | 8/1973 | Terry . |
| 3,781,818 | 7/1973 | Pardoe . |
| 3,803,502 | 12/1974 | Phillot . |
| 3,804,982 | 4/1974 | Brown . |
| 3,855,533 | 12/1974 | Schueli . |
| 3,909,630 | 8/1975 | Fiorino . |
| 4,025,720 | 5/1977 | Pachynski . |
| 4,049,910 | 10/1977 | Jolivet . |
| 4,147,891 | 12/1979 | Roos . |

Primary Examiner—Harold I. Pitts
Attorney, Agent, or Firm—Cushman, Darby & Cushman

[57] ABSTRACT

A data transmission system to enable data to be transmitted along a transmission path at a rate C greater than the upper data rate limit A of the path. A data transmitter driven by an internal clock at C Hertz transmits data along the transmission path and at the same time also transmits a derived clock signal at a frequency C/N Hertz where (C/N)<A along the path. At the receiver the data is clocked into a series of data stores under the control of the transmitted clock signal and is thereafter recombined into a serial stream under the control of the clock signal driving the receiver.

12 Claims, 4 Drawing Figures

DIGITAL DATA TRANSMISSION

This is a continuation, of application Ser. No. 042,224 filed May 24, 1979 now abandoned.

The invention relates to a system which is suitable for increasing the signalling speed between units of a digital system.

In the operation of digital systems, it is often necessary to transmit digital data from one location to another, and it is always desirable that the data be transmitted as rapidly as possible. The transmission of digital data can take place from one system at one location to a system at another location, or between sub-units of the system which are interconnected by means of a long transmission path. The highest rate at which data can be correctly transmitted between racks, for example in a large digital system which is made up of a number of sub-units housed in racks which are connected together by means of inter-rack wiring, is reached when the various timing errors within the system contribute towards a worst-case error condition at some point within the system. Re-timing problems then arise at a sub-unit when the timing error between the data signal and the clock signal becomes significant in comparison with the duration of each byte of data. This limitation is generally accepted at the design stage, and data transmission rates between sub-units in a synchronous system tend to be set at a rate at which re-timing problems do not arise.

A system can be regarded as having an upper natural data rate, this being a rate at or below which data transmission can take place within the system without timing problems, but above which timing problems will occur. The upper natural data rate of a system may be exceeded by the use of special transmission techniques within the system.

It is an object of the present invention to provide a method or an apparatus for exceeding the upper natural data rate of a system.

According to the invention, we provide a data transmission system for transmitting digital data along a transmission path from a first location to a second location comprising, a data transmitter at said first location and arranged to transmit said digital data and a first clock signal derived from a first clock signal generator along said transmission path, a plurality of data stores at said second location, switching means at said second location and aranged to distribute the data received at said second location into said data stores under the control of the said first clock signal, means at said second location for recombining the data from said stores into a serial stream under control of a second clock signal from a second clock signal generator at said second location, the frequency of the second clock signal being a multiple of the frequency of the first clock signal.

Where the transmission path between the two locations has an upper data rate limit of A bits/sec, and the data is transmitted at a data rate of C bits/sec, where C exceeds A, the frequency of the first clock signal must be less than A Hertz to ensure its correct transmission. This correctly transmitted signal is then used to distribute the data signal to the data stores prior to its reassembly and hence retiming to the second or local clock signal.

The method of transmitting data from the first to the second location may include the step of reclocking the data from the data stores into further data stores under the control of the second clock signal from a generator situated at the second location, the data from the further data stores being then multiplexed on to a single data highway under the control of the receiver clock generator.

Figure 2:
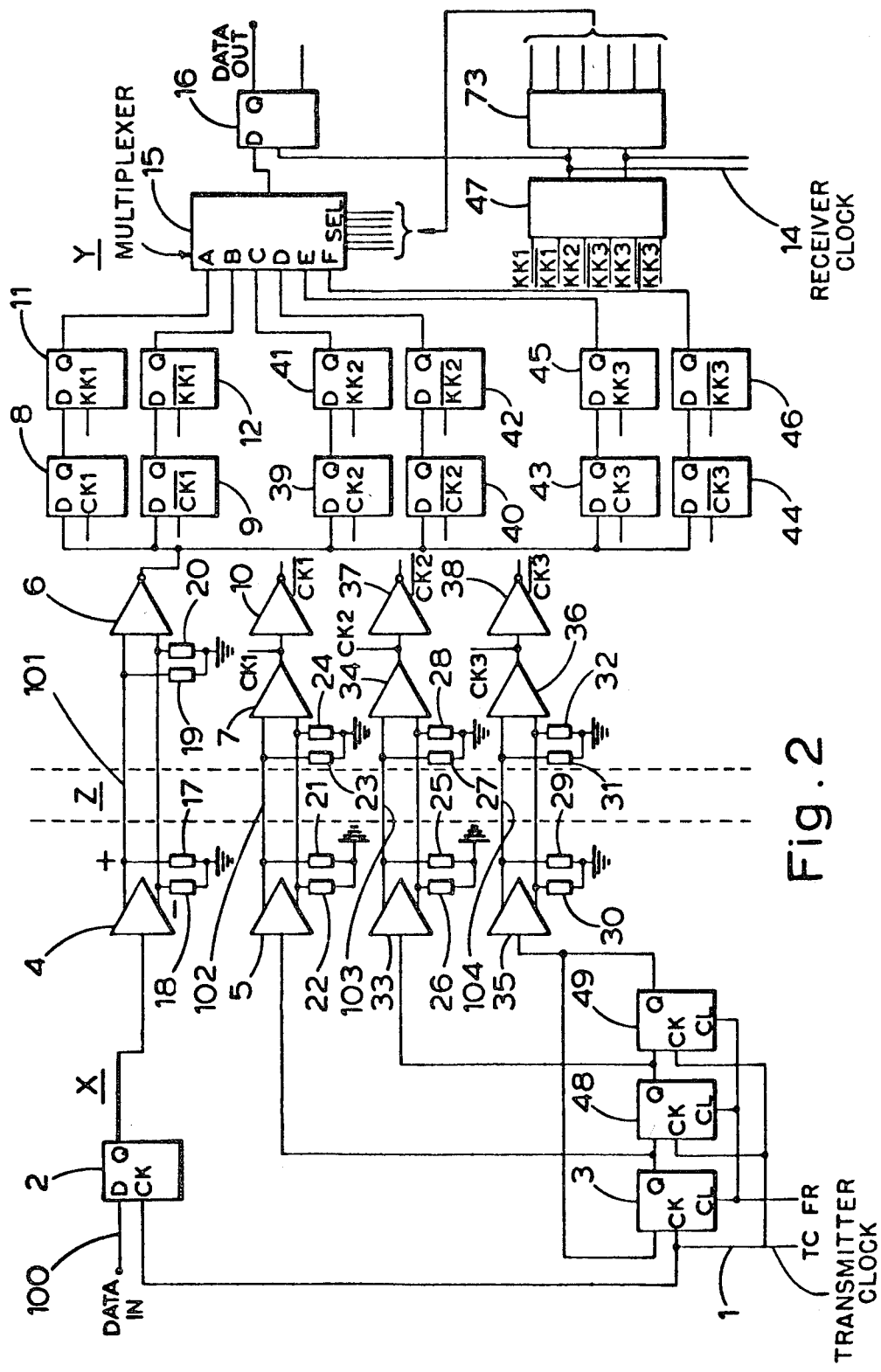
Figure 3:
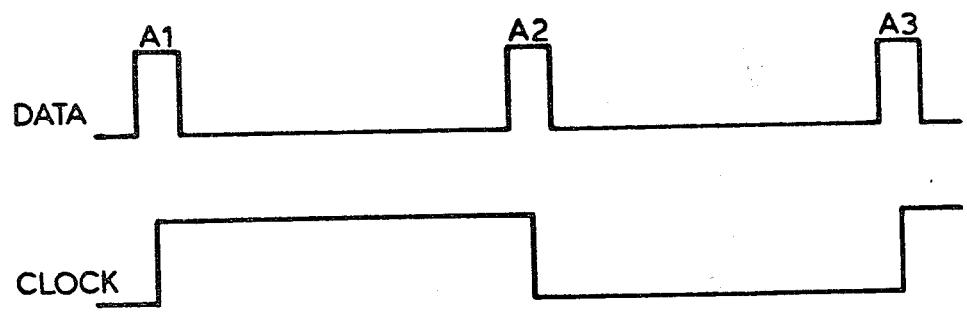
Figure 4:
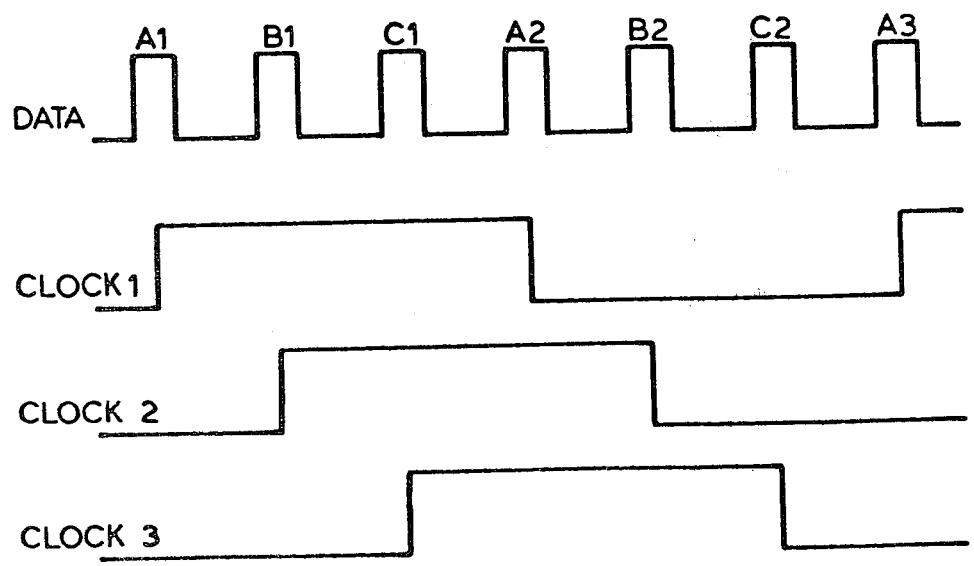

Apparatus for transmitting digital data from a first location to a second location at a rate which exceeds the upper natural data rate limit of the system, and the method of operating the apparatus, will now be described, by way of example only, with reference to the accompanying drawings, in which:

FIG. 1 illustrates in block schematic form, the apparatus situated at the first and the second locations, and the transmission path, for a system capable of operating at nearly twice the upper natural data rate, FIG. 2 illustrates, in block schematic form, the apparatus situated at the first and the second locations, and the transmission path, for a system capable of operating at nearly N times the upper natural data rate, FIG. 3 illustrates suitable waveforms for the correct operation of the system illustrated in FIG. 1, and FIG. 4 illustrates suitable waveforms for the correct operation of the system, illustrated in FIG. 2.

The digital system shown in FIG. 1 represents apparatus sited at first and second locations X and Y which are connected by a transmission path Z having for example natural data rate limit of between 2048 K bits/sec., and 4096 K bits/sec. The data transmission rate may then be chosen to be 4096 K bits/sec. The internal clock signal highway at the first location is arranged to run at 4096 HKz., and this clocking signal is made available on a line 1 which is connected to the clock terminal of a D-type flip-flop 2 and the clock terminal of a JK flip-flop 3. The JK flip-flop 3 is arranged with the J and K input terminals connected to logical "1" potentials, and it therefore functions as a complementing flip-flop, the output signal being a rectangular waveform at half the internal clock frequency with the transitions occurring at or near the centers of data transmission periods. Data to be transmitted is applied to the D-input-terminal 100 of the D-type flip-flop 2 and appears at the output terminal in synchronism with the 4096 KHz internal clock signal. The 2048 KHz clock-derived signal from the binary divider 3 is passed to a differential-output transmission-line driver 5 before it reaches the transmission path, and the data signal is similarly amplified by a transmission-line driver 4 before transmission.

The transmitted data therefore appears on a part 101 of the transmission path at the rate of 4096 K bits/sec., and the clocking signal appears on a part 102 of the transmission path at the rate of 2048 KHz. The data signal received at the second location is received by means of a differential-input single-ended output line receiver 6, and the clocking signal is received by means of a differential-input single-ended output line receiver 7. Flip-flops 8 and 9, which are a pair of data stores, are edge-triggered flip-flops which are arranged to accept data on a positive-going clock pulse. The flip-flop 9 is arranged to receive the inverted 2048 KHz clock signal which is provided by the inverter 10, and the flip-flop 8 is arranged to receive the 2048 KHz clock signal directly. The flip-flop 8 and 9 are therefore arranged to accept data alternately, "odd" alternate bits of the data leaving the line receiver 6 at 4096 K bits/sec., being stored in the data store 8 and "even" alternate bits of the data leaving the line receiver 6 at 4096 K bits/sec., being stored in the data store 9. The terms "odd" and "even" are used in order to distinguish the two sets of data bits. The "odd" data bits are then passed on to one 11 of a pair of further data stores which is a D-type flip-flop, and the "even" n data bits are passed on to the other 12 of the further pair of data stores which is another D-type flip-flop. The data is read into the flip-flops 11 and 12 under the control of a local 2048 KHz clock signal which is provided by a second binary divider 13 from a local 4096 KHz clock signal which exists on a line 14. The secondary binary divider 13 is a JK flip-flop which has logical "1" inputs provided on the J and K inputs and which therefore acts as a complementing or toggle flip-flop, and divides the 4096 KHz input clock signal by two. The "odd" and "even" bits of data stored respectively in the flip-flops 11 and 12 are recombined by means of a data selector 15. The "select" control of the data selector 15 is connected to the second binary divider 13, and is therefore clocked at 2048 KHz. The data selector 15 is provided with two input terminals and a single output terminal, and functions to select data from one of the input terminals when the clock signal to the "select" terminal is a logical "1", and to select data from the other input terminal when the clock signal to the "select" terminal is a logical "0", the selected data appearing on the output terminal. When the data selector is being clocked by the 2048 KHz signal from the second binary divider 13, the "odd" and "even" bits of data appear alternately on the single output terminal. The data signal is therefore returned to its original form by means of the data selector and being retimed to the clock signal at the second location. The recombined data then passes to an output data store which is a D-type flip-flop 16, and is clocked through by the 4096 KHz local clock signal.

The data signal is therefore transmitted from the first to the second location at 4096 K bits/sec., under the control of a 2048 KHz clock signal, and is retimed at the second location to the local 4096 KHz clock.

Suitable devices for the system components are as follows:

| | |
|---|---|
| Flip-flops 2, 8, 9, 11, 12, and 16 | SN74LS174 |
| Flip-flops 3, and 13 | SN74S112 |
| Data selector 15 | SN74LS157 |
| Inverter 10 | SN74S04 |
| Line drivers 4 and 5 | SN75110 |
| Line receivers 6 and 7 | SN75107 |

The resistors 17–24 shown attached to the respective transmission lines 101 and 102 are used to terminate the lines with their respective characteristic impedances, following normal practice. The resistors have resistances equal to half the characteristic impedances of the respective transmission lines with which they are associated.

In the figure, the transmission path consists of several parallel data highways (n in number), which represents the preferred arrangement for the system.

Reference may be made to FIG. 3 in order to understand the operation of the system shown in FIG. 1. The upper waveform shows three data pulses A1, A2, and A3, and the lower waveform shows a clock pulse having a 50% duty cycle and transitions arranged to coincide with the data pulses in the upper waveform. The upper natural data rate corresponds to the frequency of the pulses A1 and A3., and the additional pulse A2 represents an increase in the data rate to one above the upper natural data rate. The frequency of the clock pulse corresponds to the upper natural data rate. The clock pulse suffers minimal distortion as long as it does not exceed the upper natural data rate of the system. The use of a 50% duty cycle clock pulse results in a single clock signal providing all the necessary transitions for the correct operation of the systems. Any other duty cycle would require additional clock signals, but would not prevent the correct operation of the system. Ideally, the transitions of the clock pulse should coincide with the middle region of a data pulse. Variations in this timing relationship may cause difficulty if the clock pulse transitions approach the data pulse transitions. It will be appreciated that the data signal should be relatively constant at a value recognizable by the data stores as a logical "1" or logical "0" when the clock transitions approach the data pulse transitions. It will be appreciated that the data signal should be relatively constant at a value recognizable by the data stores as a logical "1" or logical "0" when the clock transition occurs.

Referring now to FIG. 2, the transmission system shown includes all the components parts of FIG. 1, and additional component parts required to provide transmission at nearly six times the upper natural data rate. The data signal is transmitted along the part 101 of the transmission path, and received at the second location by the differential-input single-ended-output line receiver 6. The additional component parts include additional JK flip-flops 48 and 49. The JK flip-flops 3, 48, and 49 are arranged to form a ring counter which is driven by the transmitter clock signal TC on line 1. The additional pulses provided by the flip-flops 48 and 49 are used to provide two further clock signals for transmission to the second location. These two further clock signals are transmitted along the parts 103 and 101, respectively, of the transmission path by means of transmission-line drivers 33 and 35, which are similar to the transmission line driver 5. At the second location, the two further clock signals are received by means of the line receivers 34 and 36, which are similar to the line receiver 7.

At the second location are situated additional pairs of data stores 39 and 40, and 43 and 44. The additional pair of data stores 39 and 40 are controlled by the respective clock signals provided by the line receiver 34 and an inverter 37, and the additional pair of data stores 43 and 44 are controlled by the respective clock signals provided by the line receiver 36 and an inverter 38. The data stores 39 and 40, and 43 and 44, function in the same way as the data stores 8 and 9, under the control of their respective clock signals. Further data store pairs 41 and 42, and 45 and 46, corresponding to the further data store pairs 11 and 12, are provided. These further data store pairs operate under the control of the local clock generator situated at the second location. The additional clock signals required to control the increased number of further data stores are provided by means of a local generator ring counter 47, which is similar in construction to the transmitter generator ring counter. The local generator ring counter 47 is driven by means of the local generator situated at the second location.

The stored data is subsequently rearranged into serial form by means of the multiplexer 15. This multiplexer 15 is functionally similar to that shown in FIG. 1, but it will, of course, have a larger capacity in order to accommodate the additional data signals being handled by the system. The multiplexer 15 is controlled by means of a counter 73 which is arranged to provide at least six output words in order to achieve selection of 1 out of 6 input lines of the multiplexer 15. The data is returned to the local clock generator by means of the flip-flop 16 as in FIG. 1.

The way in which the system shown in FIG. 2 operates may be understood by referring to FIG. 4. The upper natural data rate is represented by the data pulses A1 and A3, and the increased data rate results in the presence of the data pulses B1, C1, A2, B2, and C2. The data pulses are selected in pairs by the clock signals. The clock signal CLOCK 1 selects the pair A1 and A2, the clock signal CLOCK 2 selects the pair B1 and B2, and the clock signal CLOCK 3 selects the pair C1 and C2. The clock signal CLOCK 2 corresponds to the signal from the flip-flop 48, and the clock signal CLOCK 3 corresponds to the signal from the flip-flop 49.

The clock signals used in FIG. 4, have a 50% duty cycle, and by this arrangement, three clock signals provide the six transitions necessary for operating the system. Any other clock duty cycle results in an increase in the number of clock signals needed to operate the system, and will also increase the bandwidth of the clock signal, but the system will still function with clock signals having duty cycles other than 50%.

It can be seen that in the described embodiments in order to achieve nearly double the upper natural data rate (i.e. N=2), one clock signal is required, and one pair of data stores is required at the second location. In order to achieve nearly six times the upper natural data rate i.e. (N=6), then three first clock signals and three pairs of data stores at the second location are required.

It will be readily appreciated that as an alternative to transmitting a number of differing phase clock signals along the transmission path in cases where the data is being transmitted at a rate greater than twice the upper natural data rate, as in the embodiment shown in FIG. 2, a single clock signal only may be transmitted which is derived from the clock signal at the transmitter by way of a frequency divider. At the receiver the single transmitted clock signal is passed through apparatus, such as a series of parallel delay lines for example, so that appropriately timed clock signal transitions are available to gate the transmitted data to the receiver data stores.

I claim:

1. A data transmission system for transmitting digital data at a first predetermined rate along a transmission path with at least one data channel and at least one separate clock signal channel from a first location to a second location, said first rate being a rate greater than the maximum rate at which clock pulses may be transmitted along said data channel without significant timing error, said system comprising:
    a first clock signal generator and transmitter means at said first location for generating and transmitting on said clock signal channel clock signals have a second rate at which said clock signals may be transmitted along said clock channel without significant timing error,
    a data transmitter at said first location arranged to transmit said digital data on said data channel at said first rate,
    a plurality of data stores at said second location,
    switching means at said second location arranged to distribute the data received from said data channel of said second location into said data stores under control of said first clock signal received from said clock channel,
    means at said second location for recombining the data from said data stores into a serial data stream under control of a second clock signal including a second clock signal generator at said second location for providing said second clock signal, the frequency of said second clock being a multiple of the frequency of said first clock signal and at substantially said first predetermined rate.

2. A system as in claim 1 wherein a plurality of further data stores are situated at the second location and are controlled by the second clock signal generator, each of the further data stores being arranged to receive data from a respectively corresponding one of the first data stores which are controlled by the first clock signal.

3. A system as in claim 1 or 2 wherein the data transmitter situated at the first location includes a clocked data store which, in operation, is driven by an internal clock at C Hertz, and the first clock signal generator is a digital divider which, in operation, divides the internal clock signal by an integer N, where C/N does not exceed A, the upper data rate limit of the clock channel substantially without distortion.

4. A system as in claims 1 or 2 wherein:
    the data stores situated at the second location include clocked flip-flops having a clock input terminals,
    first ones of said flip-flops being arranged to receive the first clock signal or respective first clock signals from said clock channel on their clock input terminals,
    at least one inverter having an input terminal connected to receive said first clock signal and to provide an inverted first clock signal at an output terminal, and
    second ones of said flip-flops being arranged with their clock terminals connected to the output terminal of an inverter or to the output terminals of respective inverters.

5. A system as in claims 1 or 2 wherein the first clock signal generator is arranged to generate a plurality of clock signals, each having the same frequency and waveform, but varying in phase by multiples of the time interval between data bits.

6. A system as in claims 1 or 2 wherein said first clock signal generator includes an internal clock operating at a frequency higher than said first clock signal and wherein the second clock signal generator operates at the same frequency as the internal clock at said first location.

7. A method of transmitting digital data from one location to another at increased rates, said method comprising the steps of:
    transmitting a first series of digital data signals along a data channel in a signal transmission path between first and second locations at a first data rate, said first data rate being a rate greater than the maximum rate at which clock pulses may be transmitted along said data channel without significant timing error,
    transmitting a clock signal related to said data signals along a clock channel in said signal transmission path between said first and second locations at a first clock signal rate at which said clock signals may be transmitted along said clock channel without significant timing error, receiving and temporarily storing said first digital data signals at said second location under control of said first clock signal, generating a second clock signal at said second location having a rate equal to said first data rate, and generating from said stored first digital data signals a second series of digital data signals occuring at said first data rate as clocked by said second clock signal.

8. A method of transmitting data from one location to another comprising the steps of:

transmitting data signals on a data channel to a receiving site at a rate C being a rate greater than the maximum rate at which clock pulses may be transmitted along said data channel without significant timing error;

transmitting to said receiving site on a separate clock channel at least one phase related clock signal having rate C/N where N is an integer greater than one, said rate C/N being a rate at which said clock signal may be transmitted along said clock channel without significant timing error, and retiming the received data signals at the receiving site with a locally generated clock signal having a rate C.

9. A method of transmitting data from one location to another as in claim 8 wherein said retiming step comprises:

storing the received data signals in a first rank of digital storage registers under control of the transmitted and received clock signal(s) having a rate C/N, and thereafter transferring the data contents of said first rank of digital storage registers to a second rank of digital storage registers under control of said locally generated clock signal having a rate C.

10. A method as in claim 8 or 9 wherein said retiming step comprises multiplexing onto a serial data line temporarily stored data from each of a plurality of digital storage registers.

11. Apparatus for transmitting digital data signals and phase-related clock signals from one location to another over a transmission path, having separate clock and data channels, said apparatus comprising:

a clock signal frequency divider at a first location connected to receive clock signals of a first frequency C and to deliver clock signals of a second lower frequency C/N where N is an integer greater than one, a data signal transmitter connected to transmit data signals at a frequency C to a second location over a data channel, said frequency C being above the maximum frequency at which clock pulses may be transmitted over said data channel without significant timing error, a clock signal transmitter connected to transmit said clock signals at frequency C/N to said second location over a separate clock channel, said frequency C/N being such that said clock signals may be transmitted over said clock channel without significant timing error, a data signal receiver at said second location connected to receive said transmitted data signals and to provide corresponding received data signals at a frequency C, a clock signal receiver located at said second location connected to receive said transmitted clock signals and to provide related control signals of frequency C/N, first data storage means connected to receive said received data signals and to store same under control of said control signals, a local clock signal generator at said second location delivering clock signals of a frequency C, and second data storage means at the second location connected to receive the stored data signals in said first data storage means and to provide a series of corresponding output digital data signals at a frequency C under control of the local clock signal generator.

12. Apparatus as in claim 11 wherein said first data storage means includes a plurality of binary storage stages and wherein said second data storage means comprises:

a plurality of binary storage stages individually and respectively corresponding to the individual binary storage stages of said first data storage means, a frequency divider means connected to receive the locally generated clock signals of frequency C and to provide phase related control clock signals of frequency C/N connected, in turn, to control the transfer of digital data from the first data storage means to the second, and multiplexing means connected to sequentially output at a frequency C the digital data signals stored in the individual binary storage stages of the second data storage means under control of and in time synchronization with the locally generated clock signals of frequency C.

* * * * *